Figure 1:
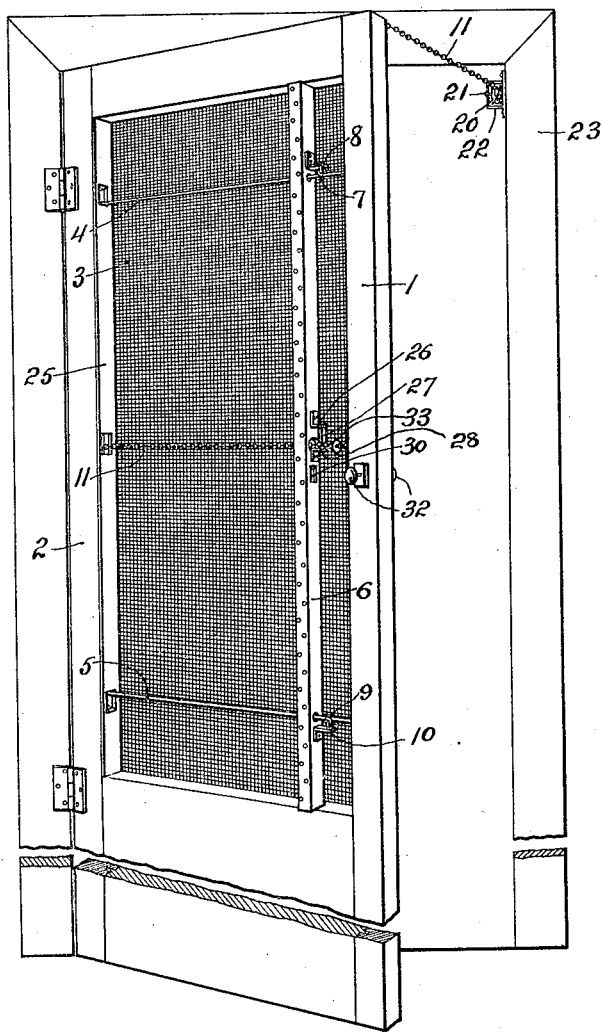

T. E. ERICSON.
FLY SWATTER MECHANISM FOR SCREEN DOORS.
APPLICATION FILED MAY 22, 1914.

1,128,301.

Patented Feb. 16, 1915.

3 SHEETS—SHEET 1.

WITNESSES:

INVENTOR.

BY

His ATTORNEY.

THE NORRIS PETERS CO. PHOTO-LITHO., WASHINGTON, D. C.

T. E. ERICSON.
FLY SWATTER MECHANISM FOR SCREEN DOORS.
APPLICATION FILED MAY 22, 1914.
1,128,301.
Patented Feb. 16, 1915.
3 SHEETS—SHEET 2.
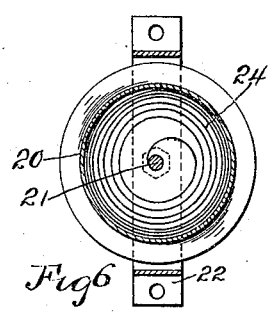
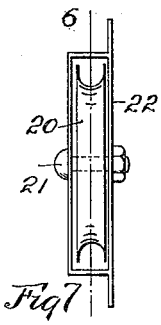
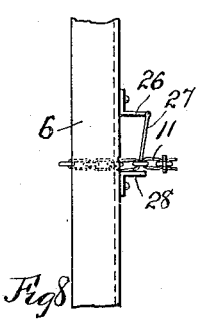
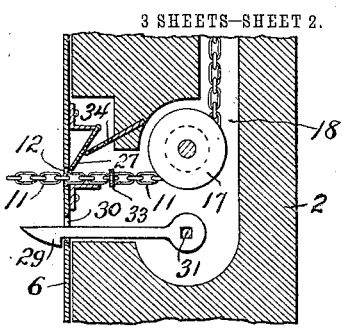
Fig 6. Fig 7. Fig 8. Fig 9.
Fig 4. Fig 3. Fig 5.
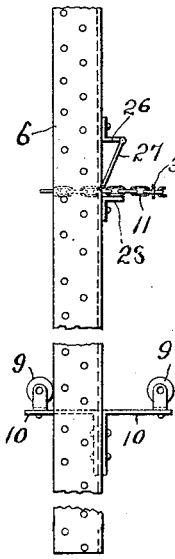
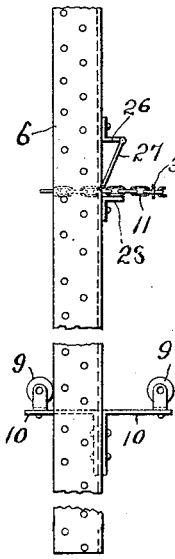
WITNESSES:
INVENTOR.
Thure E. Ericson
BY
Warren D. House
His ATTORNEY.

T. E. ERICSON.
FLY SWATTER MECHANISM FOR SCREEN DOORS.
APPLICATION FILED MAY 22, 1914.
1,128,301.
Patented Feb. 16, 1915.
3 SHEETS—SHEET 3.
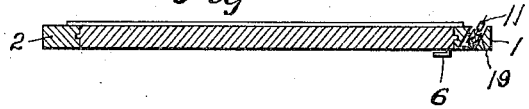
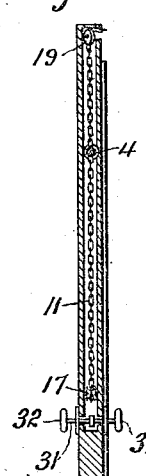
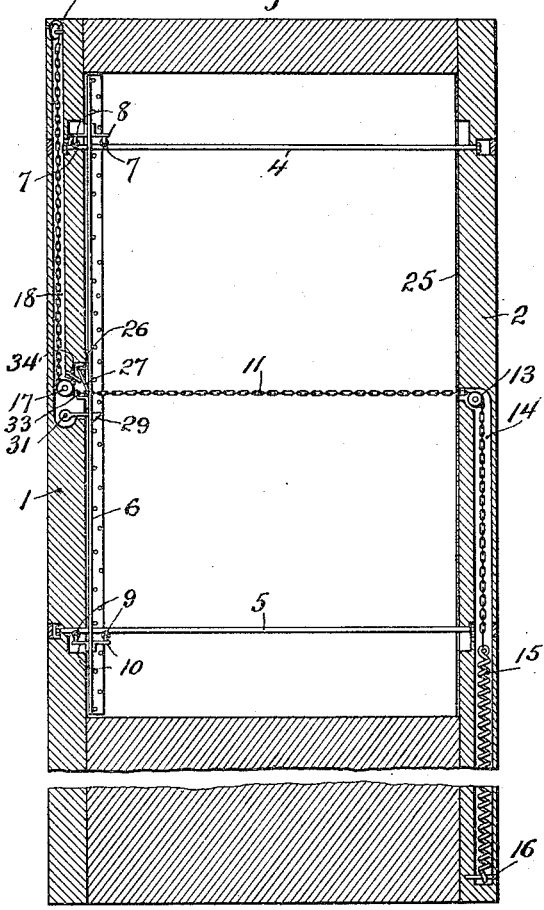
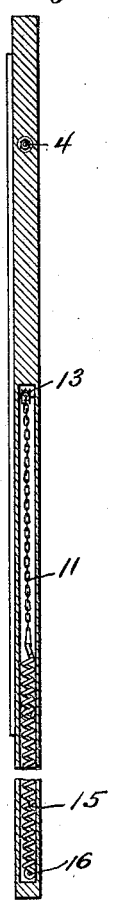
WITNESSES:
INVENTOR.

UNITED STATES PATENT OFFICE.

THURE E. ERICSON, OF CHEYENNE, WYOMING, ASSIGNOR OF ONE-HALF TO THOMAS THORSEN, OF CHEYENNE, WYOMING.

FLY-SWATTER MECHANISM FOR SCREEN-DOORS.

1,128,301. Specification of Letters Patent. Patented Feb. 16, 1915.

Application filed May 22, 1914. Serial No. 840,210.

*To all whom it may concern:*

Be it known that I, THURE E. ERICSON, a subject of the Kingdom of Sweden, residing at Cheyenne, in the county of Laramie and State of Wyoming, have invented a certain new and useful Improvement in Fly-Swatter Mechanisms for Screen-Doors, of which the following is a specification.

My invention relates to improvements in fly swatter mechanisms for screen doors.

The object of my invention is to provide a fly swatter by which flies may be swept off from the screen of a door and crushed against one of the stiles thereof.

A further object of my invention is to provide novel means for quickly and forcibly moving a sweep across the screen of a door.

Still another object of my invention is to provide novel means by which the sweep may be moved to and held in the set position upon the opening movement of the door.

Other novel features of my invention are hereinafter fully described and claimed.

In the accompanying drawings, which illustrate the preferred embodiment of my invention, Figure 1 is a perspective view showing the screen door in the partly open position, the sweep not having been yet engaged with the releasable holding means. Fig. 2 is a front elevation of a screen door provided with my improvement, the door being closed and the sweep shown in the set position. Fig. 3 is a top view of the screen door. Fig. 4 is a front elevation partly broken away of the sweep and a part of the chain which operates it. Fig. 5 is a side elevation, partly broken away, of the sweep. Fig. 6 is a vertical sectional view of the spring pulley taken on the line 6—6 of Fig. 7. Fig. 7 is a side elevation of the spring pulley. Fig. 8 is a front elevation of a portion of the sweep shown interlocked with the operating chain. Fig. 9 is an enlarged vertical sectional view showing a portion of one of the stiles of the door, a portion of the sweep adjacent to said stile and other parts adjacent thereto. Fig. 10 is a vertical sectional view taken on the line 10—10 of Fig. 3. Fig. 11 is a vertical sectional view on the line 11—11 of Fig. 2. Fig. 12 is a vertical sectional view on the line 12—12 of Fig. 2. Fig. 13 is a horizontal section on the line 13—13 of Fig. 2.

Similar reference characters designate similar parts in the different views.

1 designates one of the stiles and 2 the other stile of an ordinary screen door, having the usual screening 3 between the stiles. Two transverse rods 4 and 5 are disposed one above the other and have their ends secured respectively in suitable holes provided in the stiles 1 and 2. A sweep comprising a vertical right-angled bar 6 is provided in one flange with two transverse holes 7' and 8' through which the rods 4 and 5 respectively extend. Two grooved wheels 7 are respectively pivotally mounted on two spring brackets 8 which are secured respectively to opposite sides of one flange of the sweep 6. Similar grooved wheels 9 are respectively rotatably mounted on two spring brackets 10 secured to the sweep 6 below the rod 5. The wheels 9 are adapted for travel upon the under side of the rod 5, and the wheels 8 are adapted for travel on the upper side of the rod 4.

For reciprocating the sweep 6 between the stiles 1 and 2, I provide a flexible device, such as a chain 11 which extends transversely and horizontally through a hole 12 which is provided in the flange of the sweep 6 having the holes 7' and 8', see Figs. 5 and 9.

The chain 11 extends transversely across the door between the stiles and passes over a pulley 13 which is carried in a vertical hole or recess 14 in the stile 2. The chain 11 then extends downwardly in said hole 14 and has its lower end secured to the upper end of a vertical coil spring 15, the lower end of which is secured to a pin 16 mounted in the lower end of the stile 2. The chain 11 is loosely slidable through the hole 12 and passes under and upwardly against a pulley 17, which is mounted in a vertical hole or recess 18 in the stile 1. In the upper end of said hole 18 is mounted a pulley 19 over which the chain 11 passes. From the pulley 19 the chain 11 passes to the top of a hollow pulley wheel 20 to the periphery of which said chain is secured, see Fig. 1. The pulley 20 is rotatably mounted on a central transverse bolt 21 which is mounted in a frame 22 which is secured to one of the jambs of a door frame 23 near the upper end thereof, as is shown in Fig. 1. A convolute retracting spring 24 has one end secured to and adapted to be wound on the bolt 21. The other end of said spring is secured to the inner periphery of the pulley 20. The spring 24 is weaker than the spring 15 and is adapted to be wound when the spring 15 is permitted to retract the chain 11 so as to force the sweep 6 with the flange containing the hole 12 against the adjacent side of the stile 2, which on that side is provided with a rubber facing 25, as is shown in Figs. 1, 2 and 10.

As shown in Figs. 4, 5, 8, 9 and 10, one flange of the sweep 6 has secured to it a bracket 26 to which is pivoted the upper end of a plate 27, the lower end of which is adapted, when the chain 11 is drawn to the left, as viewed in Fig. 10, to lockingly engage the chain 11, as shown in Fig. 8, with the plate 27 and a bracket 28 which is secured to the sweep 6 below the opening 12.

When the screen door is in the closed position, the sweep 6 will be lockingly engaged by a latch 29, which is pivoted in the hole 18 of the stile 1 and is adapted to extend through a hole 30 provided in the sweep 6, as shown in Fig. 9. The latch 29 is secured to a knob shank 31 which is pivotally mounted in the stile 1 and has secured to its opposite ends knobs 32, respectively. When either one of the knobs 32 is turned to release the latch 29 from the sweep 6, a button 33 which is secured to the chain 11, Fig. 9, will engage the plate 27 whereupon the spring 15 will retract the chain 11, thereby drawing the sweep 6 forcibly across the screening 3, thereby sweeping flies from off said screening and causing some of the flies to be mashed against the rubber facing 25 by the flange of the sweep which is parallel with said facing. If now the door be opened, the spring 24 having been fully wound, and the chain 11 wholly unwound from the pulley 20, by the action of the spring 15, the chain 11 will be drawn by the opening movement of the door over the pulleys 13, 17 and 19 against the tension of the spring 15.

As hereinbefore described, as soon as the chain 11 starts to move to the left, as viewed in Fig. 10 and to the right, as viewed in Figs. 1 and 2, the swinging plate 27 will lockingly engage the chain 11 and will assume the position shown in Fig. 8. Continued opening movement of the door will cause the chain 11 to draw the sweep 6 into engagement with the latch 29, as shown in Figs. 2 and 10. At this time, an inclined plate 34, Fig. 9, which is secured in the stile 2, will strike the plate 27 and force it to the released position shown in Figs. 9 and 10, thereby releasing the chain 11 so as to permit it to pass through the hole 12 of the sweep 6. At this time, the sweep 6 will be held by the latch 29 from being retracted by the spring 15, which has been partly expanded and is in the position shown in Fig. 10. Further opening movement of the door will cause the chain 11 to be drawn still farther through the opening 12 until the door is fully opened and the spring 15 fully expanded. If the door is now closed, the spring 15 will contract to the position shown in Fig. 10, and the sweep 6 will be in the set position shown in Fig. 10. In the closing movement of the door, the spring actuated pulley 20 serves as a take-up, and winds thereon the slack of the chain 11.

I do not limit my invention to the structure shown and described, as modifications, within the scope of the appended claims, may be made without departing from the spirit of my invention.

Having thus described my invention, what I claim and desire to secure by Letters Patent, is:—

1. In fly swatter mechanisms for screen doors, the combination with a screen door, of a sweep adapted for transverse travel across said door, a flexible device mounted on and adapted for longitudinal movement transversely across said door, means by which said flexible device may engage and reciprocate said sweep, means adapted to be secured to a stationary object, such as a door frame, for engaging and holding one end of said flexible device, so as to move said device, and sweep in one direction when the door is opened, and yielding means for retracting said device in the opposite direction.

2. In fly swatter mechanisms for screen doors, the combination with a screen door, of a sweep adapted for transverse travel across said door, a flexible device mounted on and adapted for longitudinal movement transversely across said door, means by which said flexible device may engage and reciprocate said sweep, a yielding take-up mechanism adapted to be secured to a stationary object, such as a door frame, and attached to one end of said device, and arranged to move said device and sweep in one direction relative to said door when the door is opened, and yielding means for retracting said device in the opposite direction.

3. In fly swatter mechanisms for screen doors, the combination with a screen door, of a sweep adapted for transverse travel across said door, a flexible device mounted on and adapted for longitudinal movement transversely across said door, means by which said flexible device may engage and reciprocate said sweep, a yielding take-up mechanism adapted to be secured to a stationary object, such as a door frame, and attached to one end of said device, and arranged to move said device and sweep in one direction relative to said door when the door is opened, and a spring for retracting said device in the opposite direction.

4. In fly swatter mechanisms for screen doors, the combination with a screen door, of a sweep for transverse travel across said door, a flexible device mounted on and adapted for longitudinal movement transversely across said door, means by which said flexible device may engage and reciprocate said sweep, take-up mechanism including a spring adapted to be secured to a door frame, for drawing said device in one direction, and a spring of greater strength than the first named spring for retracting said device in the opposite direction.

5. In fly swatter mechanisms for screen doors, the combination with a screen door, of a sweep adapted for transverse travel across said door, means for moving said sweep in one direction actuated by the opening movement of the door, and a retracting spring for resisting such movement of the sweep, and carried by the door.

6. In fly swatter mechanisms for screen doors, the combination with a screen door, of a sweep adapted for transverse travel across said door, means including a spring actuated by the opening movement of the door for moving said sweep in one direction, and a retracting spring of greater strength than the first named spring for moving the sweep in the opposite direction when the door is closed and the sweep is released.

7. In fly swatter mechanisms for screen doors, the combination with a screen door, of a sweep adapted for transverse travel across said door to a pre-determined position, means for releasably holding the sweep in said position, means actuated by the opening movement of the door for moving said sweep to said pre-determined position, and means for retracting said sweep from said position when the door is closed and the sweep is released.

8. In fly swatter mechanisms for screen doors, the combination with a screen door, of a sweep adapted for transverse travel across said door to a pre-determined position, releasable means for holding the sweep in said position, a flexible device, means by which said device may engage and reciprocate said sweep, means adapted to be secured to a door frame and connected to said device for moving said device in one direction and operative by the opening of the door, and yielding means for retracting said device in the opposite direction, when the sweep is released and the door is closed.

9. In fly swatter mechanisms for screen doors, the combination with a screen door, of a sweep adapted to traverse travel across said door to a pre-determined position, releasable means for holding said sweep in said position, a longitudinally movable flexible device, means by which said device may engage and reciprocate said sweep, a spring retracted pulley adapted to be secured to a door frame and secured to one end of said flexible device, and a spring for retracting said device secured to the other end of said device, and having greater strength than the spring of said pulley, said flexible device being carried by said door and movable transversely thereon.

10. In fly swatter mechanisms for screen doors, the combination with a screen door, of a sweep adapted for transverse travel across said door to a pre-determined position, a flexible device mounted on and adapted for longitudinal movement transversely across said door, means carried by said sweep for locking the sweep to said device when the device is moved in one direction, means carried by the door for releasing said locking means when the sweep has been moved to said position, releasable means for holding the sweep in said position, means carried by said device for retracting the sweep when released from said position, when said device is retracted, yielding means for retracting said device, and means connected with said device and actuated upon the opening movement of the door for moving said flexible device against said yielding retracting means and to a position in which said sweep will engage said holding means.

11. In fly swatter mechanisms for screen doors, the combination with a screen door, of a sweep adapted for transverse travel across said door to a pre-determined position, means for releasably locking the sweep in said position, a flexible device longitudinally movable on said door, means by which said flexible device may engage and reciprocate said sweep, when said device is reciprocated, a spring retracted pulley connected to one end of said flexible device and adapted to be secured to a door frame, and a spring carried by the door and having one end secured thereto, and having its other end secured to the other end of said flexible device, and having greater strength than the spring of the pulley.

12. In fly swatter mechanisms for screen doors, the combination with a screen door, of a sweep adapted for transverse travel across said door to a pre-determined position and having a hole therethrough, and adapted to be retracted against one stile of the door, a flexible device longitudinally movable through said hole and extending transversely across said door, a member hinged to said sweep, and adapted when said device is moved in one direction to interlock therewith so as to move said sweep to said pre-determined position, means carried by the door for releasing said hinged member from said device when the sweep has been moved to said pre-determined position, means carried by said device for engaging said sweep for moving it from said pre-determined position, a spring connected to one end of said device for moving it so as to draw said sweep from said position against said stile, a pulley attached to the other end of said device, a spring for turning the pulley so as to wind said device thereon, and having less strength than the first named spring, and means adapted to be secured to a door frame for supporting said pulley.

13. In fly swatter mechanisms for screen doors, the combination with a screen door, of a sweep adapted for transverse travel between the stiles of the door, releasable means for holding said sweep adjacent to one stile of the door, and spring actuated means for moving said sweep forcibly against the other stile of the door.

14. In fly swatter mechanism for screen doors, the combination with a screen door, of a sweep adapted for transverse travel between the stiles of the door, releasable means for holding said sweep adjacent to one stile, spring actuated means for forcing the sweep when released from said holding means against the other stile of the door, and means actuated by the opening movement of the door for bringing said sweep into engagement with said holding means.

15. In fly swatter mechanism for screen doors, the combination with a screen door, of a sweep adapted for transverse travel across the door, means actuated by the opening movement of the door for moving the sweep in one direction across the door, and means for retracting the sweep in the opposite direction.

16. In fly swatter mechanisms for screen doors, the combination with a screen door, of a sweep adapted for transverse travel across the door, a spring for moving the sweep in one direction, and means actuated by the opening movement of the door for moving the sweep in the opposite direction against the pressure of said spring.

17. In fly swatter mechanisms for screen doors, the combination with a screen door, of a sweep adapted for transverse travel across the door, means actuated by the opening movement of the door for moving the sweep in one direction across the door to a pre-determined position, releasable means for holding the sweep in said position, and a spring for retracting the sweep in the opposite direction.

In testimony whereof I have signed my name to this specification in presence of two subscribing witnesses.

THURE E. ERICSON.

Witnesses:
   THOMAS THORSEN,
   CHARLES E. LANE.

Copies of this patent may be obtained for five cents each, by addressing the "Commissioner of Patents, Washington, D. C."